(12) United States Patent
Flick

(10) Patent No.: US 7,501,937 B2
(45) Date of Patent: *Mar. 10, 2009

(54) VEHICLE SECURITY DEVICE INCLUDING PRE-WARN INDICATOR AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 784 days.

This patent is subject to a terminal disclaimer.

(21) Appl. No.: 10/649,267

(22) Filed: Aug. 27, 2003

(65) Prior Publication Data

US 2005/0046553 A1 Mar. 3, 2005

(51) Int. Cl.
*B60R 25/10* (2006.01)

(52) U.S. Cl. .............................. 340/426.1; 340/426.14; 340/429

(58) Field of Classification Search .............. 340/425.5, 340/426.1, 429, 426.12, 426.13, 426.14, 340/426.15

See application file for complete search history.

(56) References Cited

U.S. PATENT DOCUMENTS

| 4,055,772 | A | 10/1977 | Leung | 307/10 R |
|---|---|---|---|---|
| 4,236,594 | A | 12/1980 | Ramsperger | 180/167 |
| 4,288,778 | A | 9/1981 | Zucker | 340/64 |
| 4,383,242 | A | 5/1983 | Sassover et al. | 340/64 |
| 4,446,460 | A | 5/1984 | Tholl et al. | 340/825.69 |
| 4,538,262 | A | 8/1985 | Sinniger et al. | 370/85 |
| 4,697,092 | A | 9/1987 | Roggendorf et al. | 307/10 R |
| 4,754,255 | A | 6/1988 | Saunders et al. | 340/64 |
| 4,760,275 | A | 7/1988 | Sato et al. | 307/10 R |
| 4,761,645 | A | 8/1988 | Mochida | 340/825.31 |
| 4,792,783 | A | 12/1988 | Burgess et al. | 340/22 |

(Continued)

FOREIGN PATENT DOCUMENTS

DE 19530721 2/1997

(Continued)

OTHER PUBLICATIONS

Society of Automotive Engineers, Inc., "Surface Vehicle Information Report", SAE J2058 (Jun. 21, 1990).

(Continued)

*Primary Examiner*—Brent Swarthout
(74) *Attorney, Agent, or Firm*—Allen, Dyer, Doppelt, Milbrath & Gilchrist, P.A.

(57) ABSTRACT

A pre-warn vehicle security device is for a vehicle including a data communications bus, an alert indicator, and an alarm controller interfacing with the data communications bus. The alarm controller may cause the alert indicator to generate an alarm indication responsive to a high security threat level. More particularly, the pre-warn vehicle security device may include a housing and a multi-stage sensor carried by the housing. The multi-stage sensor may sense the high security threat level and communicate the sensed high security threat level to the alarm controller via the data communications bus. It may also sense a low security threat level lower than the high security threat level. Moreover, the pre-warn vehicle security device may also include a pre-warn indicator carried by the housing and connected to the multi-stage sensor for generating a pre-warn indication responsive to the sensed low security threat level.

21 Claims, 7 Drawing Sheets

U.S. PATENT DOCUMENTS

| | | | |
|---|---|---|---|
| 4,841,159 A | 6/1989 | Evans et al. ................... 307/38 |
| 4,926,332 A | 5/1990 | Komuro et al. ........ 364/424.05 |
| 5,006,843 A | 4/1991 | Hauer ................... 340/825.31 |
| 5,024,186 A | 6/1991 | Long et al. .............. 123/179 B |
| 5,040,990 A | 8/1991 | Suman et al. ................. 439/34 |
| 5,046,041 A | 9/1991 | Lecocq et al. ............... 364/900 |
| 5,049,867 A | 9/1991 | Stouffer ..................... 340/426 |
| 5,054,569 A | 10/1991 | Scott et al. .................. 180/167 |
| 5,081,667 A | 1/1992 | Drori et al. ................... 379/59 |
| 5,084,697 A * | 1/1992 | Hwang ....................... 340/541 |
| 5,142,278 A | 8/1992 | Moallemi et al. ...... 240/825.06 |
| 5,146,215 A | 9/1992 | Drori ................... 340/825.32 |
| 5,216,407 A * | 6/1993 | Hwang .................. 340/426.22 |
| 5,243,322 A | 9/1993 | Thompson et al. .......... 340/429 |
| 5,245,694 A * | 9/1993 | Zwern ........................ 704/200 |
| 5,252,966 A | 10/1993 | Lambropoulos et al. ..................... 340/825.69 |
| 5,315,285 A * | 5/1994 | Nykerk .................. 340/426.23 |
| 5,397,925 A * | 3/1995 | Carlo et al. ................. 307/10.3 |
| 5,406,270 A | 4/1995 | Van Lente ............. 340/825.34 |
| 5,469,298 A * | 11/1995 | Suman et al. ................. 359/630 |
| 5,473,540 A | 12/1995 | Schmitz ......................... 701/1 |
| 5,475,818 A | 12/1995 | Molyneaux et al. .... 395/200.05 |
| 5,481,253 A | 1/1996 | Phelan et al. .......... 340/825.31 |
| 5,506,562 A | 4/1996 | Wiesner ................... 340/425.5 |
| 5,521,588 A | 5/1996 | Kuhner et al. |
| 5,523,948 A | 6/1996 | Adrain |
| 5,555,498 A | 9/1996 | Berra et al. ............ 364/424.03 |
| 5,606,306 A | 2/1997 | Mutoh et al. ................. 640/426 |
| 5,612,578 A | 3/1997 | Drew ......................... 307/10.5 |
| 5,619,412 A | 4/1997 | Hapka ................. 364/424.045 |
| 5,646,457 A | 7/1997 | Vakavtchiev ............... 307/10.6 |
| 5,673,017 A | 9/1997 | Dery et al. .................. 340/426 |
| 5,689,142 A | 11/1997 | Liu ........................... 307/10.5 |
| 5,719,551 A * | 2/1998 | Flick .................... 340/426.25 |
| 5,721,550 A | 2/1998 | Lopez ........................ 341/176 |
| 5,751,073 A | 5/1998 | Ross ........................ 307/10.5 |
| 5,757,086 A | 5/1998 | Nagashima ................ 307/10.6 |
| 5,811,886 A | 9/1998 | Majmudar .................. 340/426 |
| 5,818,330 A | 10/1998 | Schweiger .................. 340/426 |
| 5,832,397 A | 11/1998 | Yoshida et al. ................. 701/29 |
| 5,838,255 A | 11/1998 | DiCroce ................ 340/825.69 |
| 5,912,512 A | 6/1999 | Hayashi et al. ............. 307/10.5 |
| 5,990,786 A * | 11/1999 | Issa et al. .................... 340/429 |
| 6,005,478 A * | 12/1999 | Boreham et al. ......... 340/425.5 |
| 6,011,460 A * | 1/2000 | Flick .................... 340/426.25 |
| 6,028,507 A * | 2/2000 | Banks et al. ................. 340/427 |
| 6,028,537 A * | 2/2000 | Suman et al. ............... 340/988 |
| 6,100,792 A * | 8/2000 | Ogino et al. ........... 340/426.25 |
| 6,243,004 B1 * | 6/2001 | Flick .................... 340/426.25 |
| 6,249,216 B1 * | 6/2001 | Flick .................... 340/426.14 |
| 6,275,147 B1 * | 8/2001 | Flick .................... 340/426.25 |
| 6,696,927 B2 * | 2/2004 | Flick ...................... 340/426.1 |
| 2002/0145535 A1 | 10/2002 | Flick .................... 340/825.69 |
| 2002/0180594 A1 * | 12/2002 | Flick .......................... 340/426 |

FOREIGN PATENT DOCUMENTS

| | | |
|---|---|---|
| EP | 0699562 | 7/1995 |
| WO | WO 92/10387 | 6/1992 |
| WO | 97/28988 | 8/1997 |

OTHER PUBLICATIONS

Society of Automotive Engineers, Inc., "Surface Vehicle Standard", SAE J1850 (rev'd Jul. 1995).

Mark Thompson, "The Thick and Thin of Car Cabling", IEEE Spectrum, pp. 42-45 (Feb. 1996).

* cited by examiner

VEHICLE SECURITY DEVICE INCLUDING PRE-WARN INDICATOR AND RELATED METHODS

FIELD OF THE INVENTION

The present invention relates to the field of security systems and, more particularly, to vehicle security devices and related methods.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function, U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

In addition to providing an alarm indication, certain prior art security systems also provide a pre-warning indication which has a lesser volume or shorter duration than the alarm indication. The pre-warning indication is generally triggered by a sensed security threat level that is below a high security threat level needed to trigger the alarm indication. These high and low threat levels may be sensed using a two-stage shock sensor, for example.

The pre-warning feature is particularly advantageous for warning someone who comes too close to, or makes contact with, the vehicle that the vehicle has a security system that can trigger a much more conspicuous alarm indication. Accordingly, if a would-be burglar bumps a vehicle window in an attempt to pick the door lock, a pre-warning indication is triggered to inform the perpetrator that breaking the window or opening the door will result in an alarm indication, and possibly other countermeasures as well.

Many vehicles currently include a keyless entry system, but not an alarm system that provides an alarm based upon sensed threats to the vehicle (i.e., a shock to a window, etc.). Moreover, certain vehicle alarm systems only have single-stage sensor inputs and thus do not provide any pre-warn features. That is, these alarm systems are designed to respond only to a high security threat level and, thus, only provide an alarm indication. Accordingly, to provide a pre-warn indication in a vehicle that already has one of these systems, the only way currently available to do so is to replace the system with one that is designed to provide such functionality. This may be cost prohibitive for many vehicle owners.

SUMMARY OF THE INVENTION

In view of the foregoing background, it is therefore an object of the present invention to provide a vehicle security device and related methods which provide pre-warn features without having to replace an existing vehicle security system.

This and other objects, features, and advantages in accordance with the present invention are provided by a pre-warn vehicle security device for a vehicle which may include a data communications bus, an alert indicator, and an alarm controller interfacing with the data communications bus. The alarm controller may cause the alert indicator to generate an alarm indication responsive to a high security threat level. More particularly, the pre-warn vehicle security device may include a housing and a multi-stage sensor carried by the housing. The multi-stage sensor may sense the high security threat level and communicate the sensed high security threat level to the alarm controller via the data communications bus. It may also sense a low security threat level lower than the high security threat level. Moreover, the pre-warn vehicle security device may also include a pre-warn indicator carried by the housing and connected to the multi-stage sensor for generating a pre-warn indication responsive to the sensed low security threat level.

Accordingly, the pre-warn vehicle security device may advantageously be used to provide pre-warning features in cooperation with pre-installed security systems that do not provide such functionality. That is, the multi-stage sensor still allows high security threat level events to be communicated to the alarm controller for generating alarm indications, as would be the case with an alarm controller having only a single-stage sensor input. Yet, since the pre-warn vehicle security device includes a multi-stage sensor and its own pre-warn indicator, it can also advantageously generate a pre-warn indication different from the alarm indication without having to modify or replace the alarm controller.

More particularly, the pre-warn indication may have a shorter duration than the alarm indication. Of course, the pre-warn indication may be distinguished from the alarm indication in other ways. For example, the pre-warn indication may be audible (e.g., from a horn or siren), and the pre-warn indication may have a lesser volume than the alarm indication.

Additionally, the alarm controller may also generate a confirmation signal on the data communications bus upon switching between armed and disarmed operational modes. By way of example, the confirmation signal may be for causing a vehicle device (e.g., a vehicle light interfacing with the data communications bus) to provide a confirmation indication (e.g., a flash) to inform a user that the alarm controller has switched to a desired operational mode. As such, the pre-warn emulator may advantageously cause the pre-warn indicator to provide a confirmation indication responsive to the confirmation signal. Thus, for example, where an audible pre-warn indicator is used, the pre-warn vehicle security device may also advantageously be used to provide an audible confirmation indication to the user.

The alarm controller may switch between the armed and disarmed operational modes responsive to a mode change signal on the data communications bus. Similarly, the pre-warn emulator may also switch between armed and disarmed operational modes responsive to the mode change signal. Accordingly, the pre-warn emulator may advantageously cause the pre-warn indicator to provide a confirmation indication based upon switching between the armed and disarmed operational modes.

In accordance with another advantageous aspect of the invention, the vehicle may include at least one vehicle device interfacing with the data communications bus and generating a mode change signal on the data communications bus. As such, the pre-warn vehicle security device may include an alarm circuit (such as the pre-warn emulator noted above) connected to the multi-stage sensor and interfacing with the data communications bus for switching between armed and disarmed operational modes responsive to the mode change signal. Moreover, the pre-warn vehicle security device may also include an indicator, such as the pre-warn indicator noted above, carried by the housing and connected to the alarm circuit.

Accordingly, when the alarm circuit is in the armed operational mode, it may cause the indicator to generate a pre-warn indication responsive to the sensed low security threat level, and to generate an alarm indication responsive to the sensed high security threat level. In addition, the alarm circuit may further cause the indicator to generate a confirmation indication upon switching between armed and disarmed operational modes.

The pre-warn vehicle security device may also include a signal enabler for enabling the pre-warn emulator to operate using a desired set of signals for communicating with the alarm controller via the data communications bus from a plurality of sets of signals for different alarm controllers. That is, different manufacturers typically use different codes for their alarm and keyless entry systems. The signal enabler thus allows the pre-warn emulator to "learn" the particular signals or codes appropriate for communicating with a given alarm controller. By way of example, the multi-stage sensor may be a multi-stage shock sensor. Additionally, the pre-warn indicator may be a siren, for example.

A method aspect of the invention if for upgrading a vehicle security system in a vehicle including a data communications bus. More particularly, the vehicle security system may include an alert indicator and an alarm controller for interfacing with the data communications bus and causing the alert indicator to generate an alarm indication responsive to a high security threat level. The method may include installing a pre-warn vehicle security device in the vehicle, such as the one described briefly above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
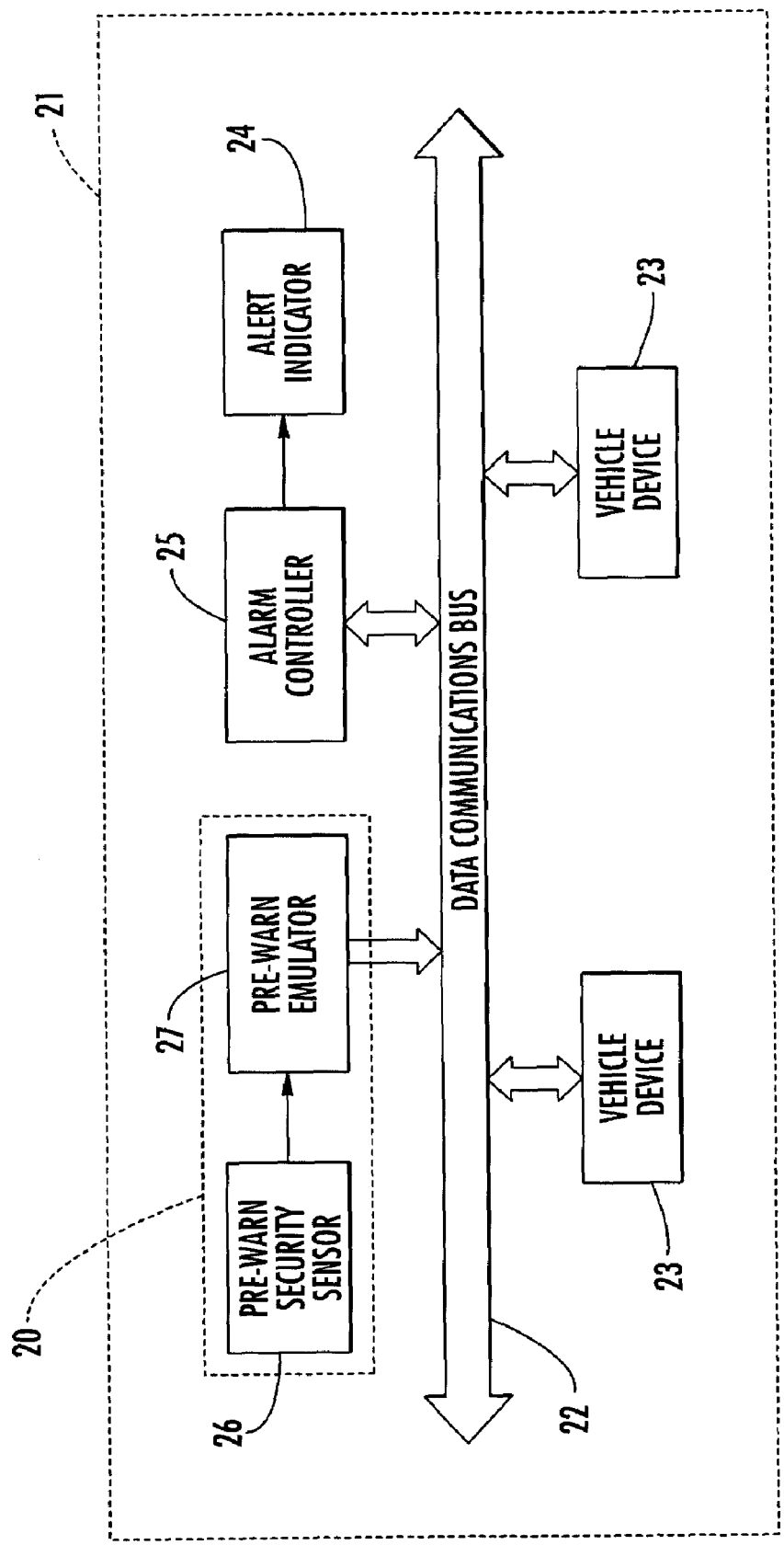
FIG. 1 is a schematic block diagram of a vehicle including a pre-warn vehicle security device in accordance with the present invention.

Referring initially to FIG. 1, pre-warn vehicle security device 20 is for use with a vehicle 21 that includes a data communications bus 22, an alert indicator 24, and an alarm controller 25. In particular, the data communications bus 22 is typically used to facilitate communications between numerous vehicle devices 23 without having to run dedicated wires throughout the vehicle 21. By way of example, such vehicle devices 23 may include horns, doorlock motors, trunk releases, engine starters, etc. Further details regarding the use of data busses within vehicles may be found in U.S. Pat. No. 5,719,551, which is assigned to the present assignee, the entirety of which is hereby incorporated herein by reference.

The alarm controller 25 cooperates with the alert indicator 24 to provide a security system for the vehicle 21. As used herein, "vehicle security system" includes both car alarm systems and keyless entry systems, as well as combinations thereof. Thus, in the case of an alarm system, the alarm controller 25 would ordinarily cause the alert indicator 24 to provide an alarm indication responsive to a sensor input (e.g., shock sensor, motion sensor, etc.) indicating a high threat level. A high threat level could also be indicated to the alarm controller 25 by a user via a hand-held wireless transmitter (i.e., a key fob) having a panic button, for example. Many alarm and keyless entry systems provide such a panic feature.

In the case of an alarm system, the alarm controller 25 is preferably switchable between armed and disarmed modes. For example, the alarm controller 25 may enter the armed mode based upon the user turning off the ignition switch, or pressing the lock button on his wireless transmitter. Of course, the alarm controller 25 in either an alarm system or a keyless entry system may similarly be placed in an armed mode for responding to a panic event. Thus, the alarm controller 25 may provide an alarm indication any time the vehicle is off and a panic signal is received from a wireless transmitter, for example.

In accordance with the invention, the pre-warn vehicle security device 20 illustratively includes a pre-warn vehicle security sensor 26 for sensing a low threat level lower than the high security threat level. For example, if the pre-warn sensor 26 is a two-stage shock sensor for a vehicle window, the low security threat level may be sensed if someone bumps or taps on the window (i.e., the first stage is triggered). In contrast, the high security threat level is only sensed if the second stage is triggered, such as by breaking the window.

Of course, other types of pre-warn sensors 26 may be used. For example, the pre-warn sensor 26 may be a motion or radar sensor for sensing the presence of a person near the vehicle 21

(i.e., a low security threat level). Other suitable sensors, such as those noted above, may also be used. On the other hand, similar sensors may be used to detect the presence of an unauthorized person within the vehicle, which would be a high security threat level.

The pre-warn vehicle device may further include a pre-warn emulator 27 which, responsive to the pre-warn vehicle security sensor 26, generates one or more signals on the data communications bus 22 so that the alarm controller 25 causes the alert indicator 24 to generate an emulated pre-warn indication different from the alarm indication. By way of example, the pre-warn emulator 27 may be implemented using a microprocessor or other suitable logic/circuitry, as will be appreciated by those skilled in the art.

As noted above, a pre-warn indication is preferably distinguished from the alarm indication by a shorter duration, and/or lesser volume for example. This is because the pre-warn indication is intended to provide a would-be thief or vandal notice that the vehicle 21 has a security system, and that further action on his part will result in a very conspicuous alarm indication. Of course, the alarm controller 25 in some embodiments could take further countermeasures, such as notifying a monitoring station or law enforcement of the high security threat level event via a wireless communications device (e.g., a cellular telephone) connected to the data communications bus 22, for example.

Figure 5:
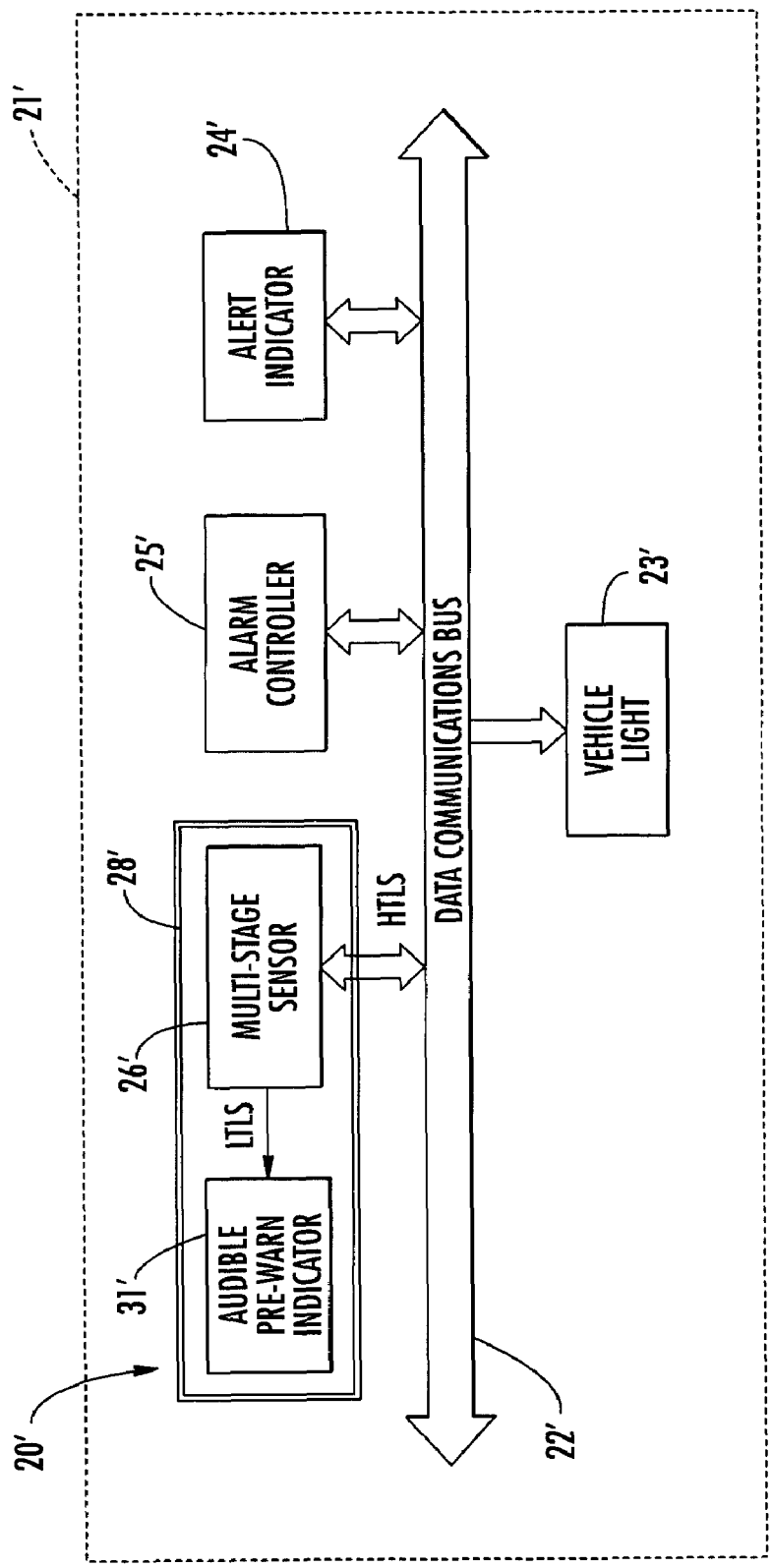
FIG. 5 is a schematic block diagram of a vehicle including an alternate embodiment of the pre-warn vehicle security device in accordance with the present invention.

By way of example, the alert indicator 24 may be an audible indicator such as a horn or siren. Of course, visual indicators such as vehicle lights or strobe lights may also be used, as will be appreciated by those skilled in the art. Further, more than one such alert indicator may be used, and different alert indicators could be used for different indications. For example, the alarm indication could be provided by a siren, and the pre-warn indication by a horn. It should also be noted that the alert indicator 24 may be directly connected to the alarm controller 25 as shown, or it may communicate with the alarm controller via the data communications bus 22 (FIG. 5).

Figure 2:
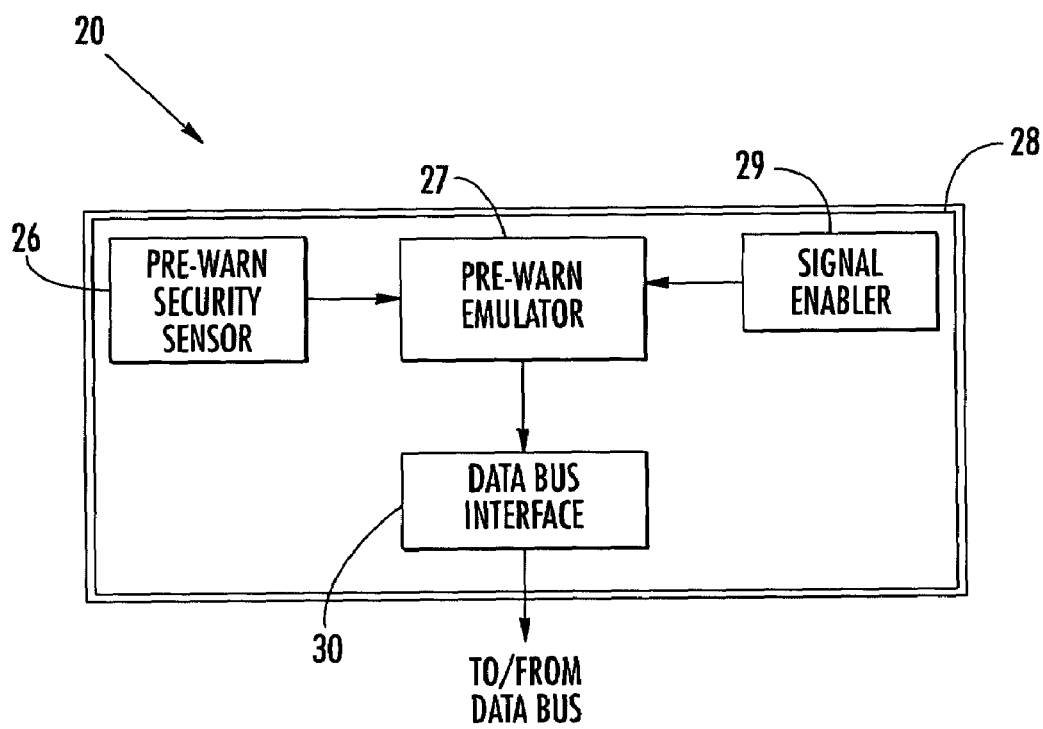
FIG. 2 is a schematic block diagram illustrating the pre-warn vehicle security device of FIG. 1 in greater detail.

Turning now additionally to FIG. 2, an exemplary embodiment of the pre-warn vehicle security device 20 also illustratively includes a housing 28 carrying the pre-warn sensor 26 and the pre-warn emulator 27 as well as a signal enabler 29 and a data bus interface 30. Numerous materials such as plastic, metal, etc., may be used for the housing 28, as will be appreciated by those skilled in the art. Generally speaking, the housing should be sufficiently rigid to protect the components carried thereby and allow mounting within the vehicle. To this end, the housing 28 may have holes formed therein for screws or other types of fasteners, for example, as will also be appreciated by those skilled in the art.

The data bus interface 30 provides signal connectivity between the pre-warn emulator 27 and the data bus 22. In addition, the signal enabler 29 enables the pre-warn emulator 27 to operate using a desired set of signals for communicating with the alarm controller 25 via the data communications bus 22 from a plurality of sets of signals for different alarm controllers. That is, various manufacturers typically use different codes for their alarm and keyless entry systems. The signal enabler thus allows the pre-warn emulator to learn the appropriate signals or codes for communicating with a given alarm controller. The signal enabler 29 may be implemented in a similar fashion to that described in U.S. Pat. No. 5,719,551, noted above, as will be appreciated by those skilled in the art.

Figure 3:
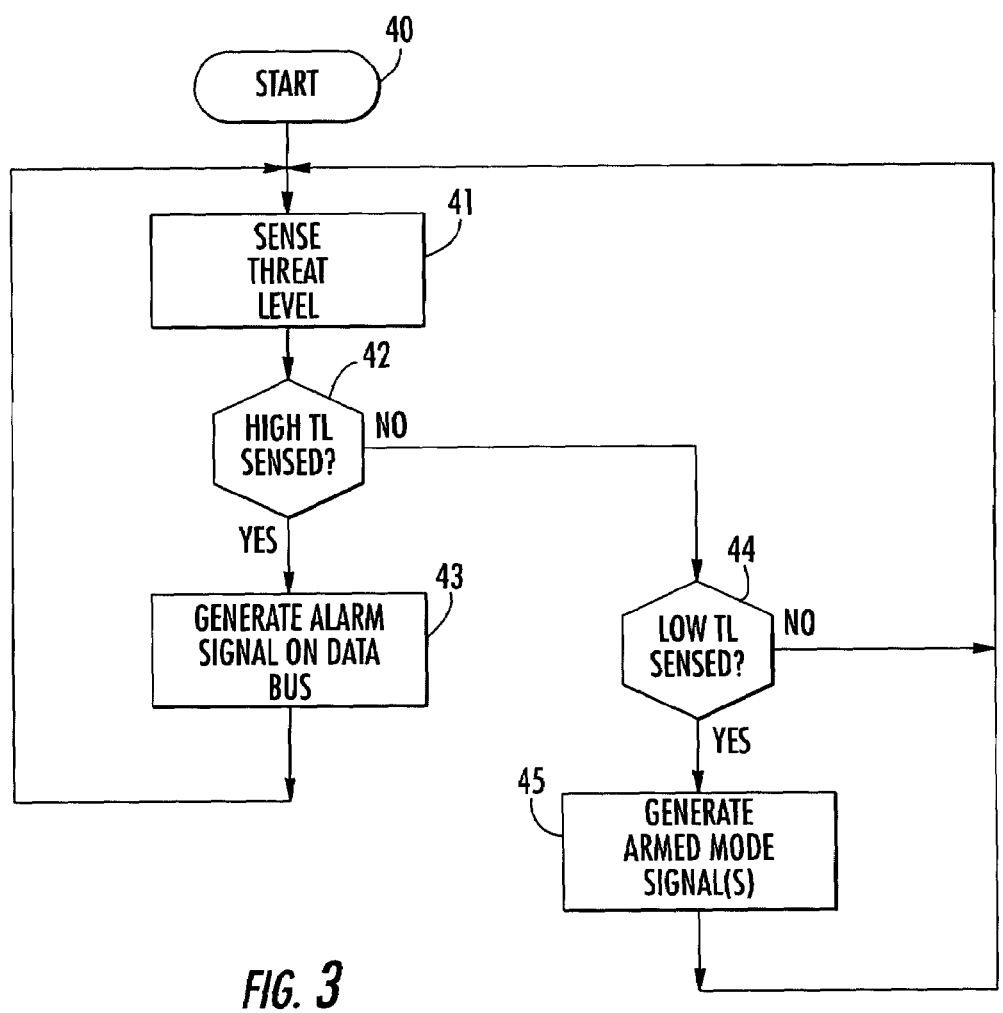
FIG. 3 is a flow diagram illustrating operation of the pre-warn vehicle security device of FIG. 1 in accordance with one aspect of the invention.

Operation of the pre-warn security device 20 will be further understood with reference to the operational flow diagram of FIG. 3. In accordance with one aspect of the invention, operation begins (Block 40) with the pre-warn sensor 26 sensing a security threat level, at Block 41. If a high security threat level is sensed, at Block 42, the pre-warn emulator 27 generates the appropriate signal or code on the data communications bus 22 for causing the alarm controller 25 to cause the alert indicator 24 to provide the alarm indication, at Block 43.

It should be noted that the appropriate code for indicating a high security threat level will vary depending upon the particular alarm controller 25 being used. That is, different alarm controllers may cause an alarm indication based upon different codes. For example, some alarm controllers respond to a door open code from a door pin switch when in an armed mode as an indication of a high security threat level (i.e., indicating that an unauthorized person has entered the vehicle 21). In any event, the signal enabler 29 allows the pre-warn emulator to use the appropriate codes for a given alarm controller 24, which may be downloaded or set during installation, as will be appreciated by those skilled in the art.

If the low security threat level is instead sensed by the pre-warn sensor 26, at Block 44, the pre-warn emulator 27 generates one or more armed mode signals, at Block 45. As noted above, many alarm controllers provide a chirp upon receiving an armed mode signal to acknowledge that the system has been placed in an armed mode. In the illustrated embodiment, the pre-warn emulator 27 causes the alarm controller 25 to provide one or more chirps as the pre-warn indication. Similarly, keyless entry systems often provide a chirp to acknowledge that a door lock and/or unlock command has been received. Accordingly, for such an application, the armed signals provided by the pre-warn emulator 27 would correspond to such door lock or unlock signals.

Figure 4:
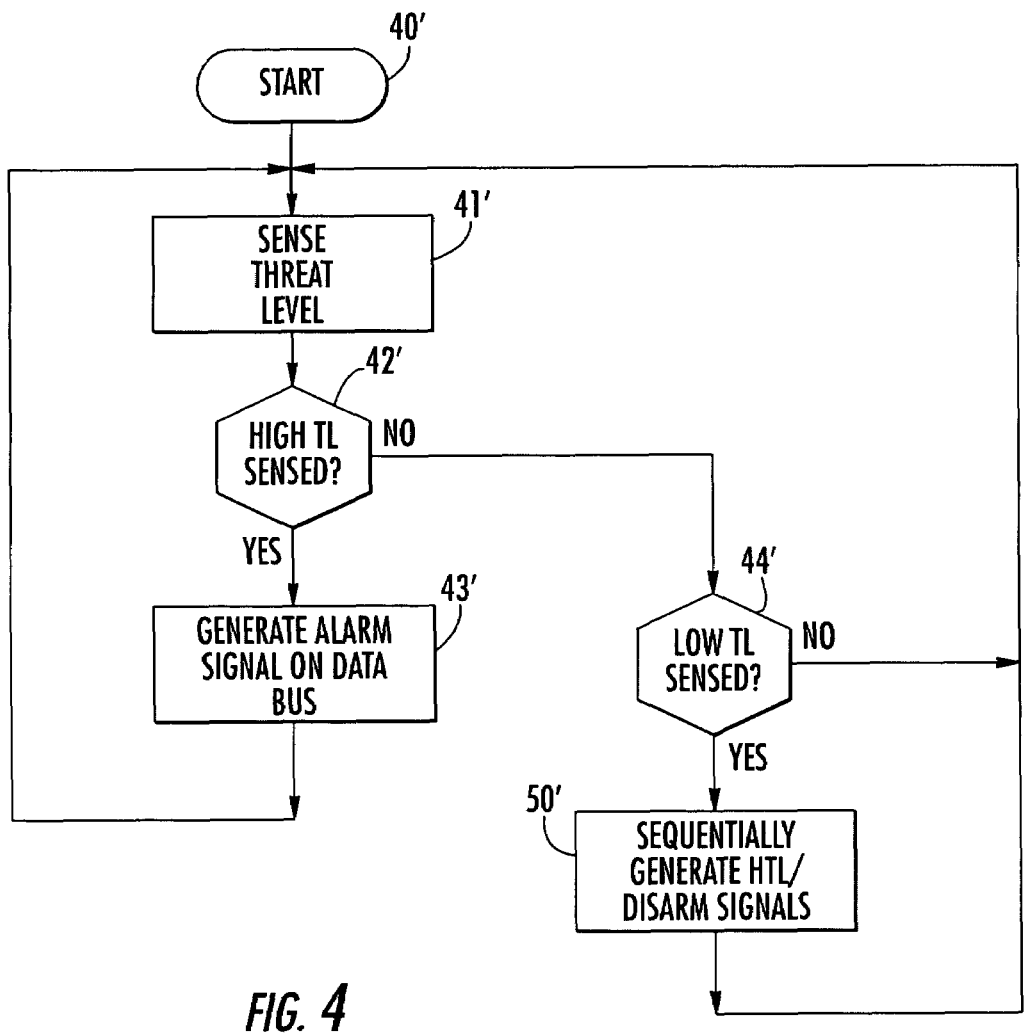
FIG. 4 is a flow diagram illustrating operation of the pre-warn vehicle security device of FIG. 1 in accordance with another aspect of the invention.

Another approach to providing the pre-warn indication is illustrated in FIG. 4. Here, responsive to the pre-warn vehicle security sensor 26 indicating the low security threat level (Block 44'), the pre-warn emulator 27 sequentially generates a high security threat level signal and a disarmed mode signal on the data communications bus 22, at Block 50'. That is, the high security threat level signal is used to cause an alarm indication, while the disarmed mode signal relatively quickly causes the alarm controller 25 to terminate the alarm indication.

In accordance with this aspect of the invention, the pre-warn indication is thus a shorter version of the alarm indication, such as about five seconds or less, for example. Not only may this pre-warn feature be used with a pre-existing alarm system that provides an alarm indication, but it may also be used with a keyless entry system providing a panic alarm indication, as noted above. That is, the pre-warn emulator may send a panic signal as the high security threat level signal, and the disarmed mode signal terminates the panic alarm indication.

Figure 6:
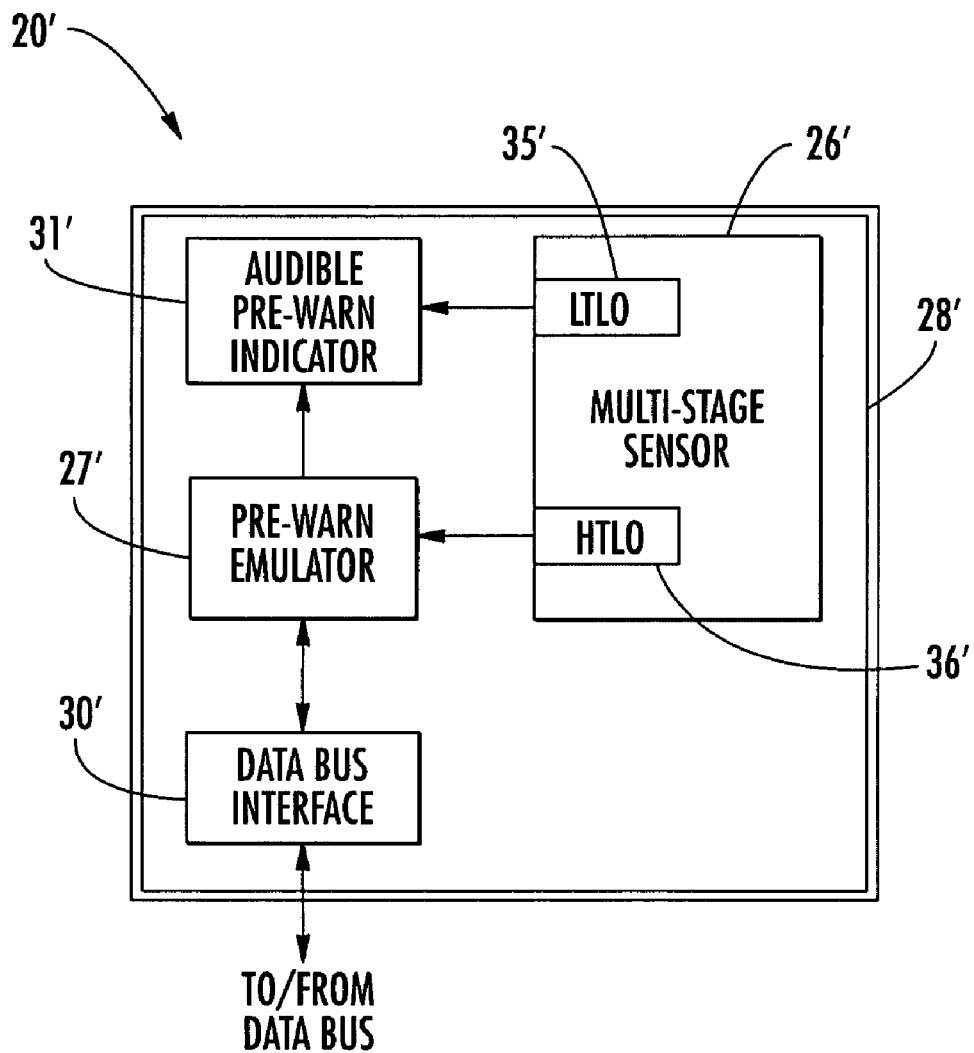
FIG. 6 is a schematic block diagram illustrating the pre-warn vehicle security device of FIG. 5 in greater detail.

An alternate embodiment of the pre-warn vehicle security device 20' is illustrated in FIGS. 5 and 6. Here, the pre-warn vehicle security device 20' includes a housing 28' and a multi-stage sensor 26' carried by the housing. The multi-stage sensor 26' may sense the high security threat level and communicate the sensed high security threat level to the alarm controller 25' via the data communications bus 22'. This could be done using the pre-warn emulator 27' to generate the high security threat level signal (HTLS). The pre-warn emulator 27' may be connected to a high-threat level output (HTLO) 36' of the multi-stage sensor, for example.

Moreover, the pre-warn vehicle security device 20' also advantageously includes a pre-warn indicator 31', such as a siren, for example, carried by the housing 28'. The pre-warn indicator 31' is connected to a low threshold level output (LTLO) 35' of the multi-stage sensor 26', which also generates a pre-warn indication responsive to a low security threat level signal (LTLS) therefrom. Thus, in accordance with this aspect of the invention, the pre-warn signal is provided by the pre-warn indicator 31', while the alarm indication is provided by the alert indicator 24'.

In accordance with another advantageous aspect of the invention, the alarm controller 25' may generate a confirmation signal on the data communications bus 22' upon switching between armed and disarmed operational modes. More particularly, the alarm controller 25' may switch between the armed and disarmed modes responsive to a mode change signal on the data communications bus 22'. By way of example, an armed mode change signal may be generated on the data communications bus 22' responsive to the user pressing a door lock button on his key fob, and a disarmed mode signal may be generated responsive to a door unlock button being pressed.

The confirmation signal is for causing a vehicle device interfacing with the data communications bus 22', such as the vehicle light 23', to provide a confirmation indication (e.g., a flash) to inform the user that the alarm controller has switched to the desired operational mode. Accordingly, the pre-warn emulator 27' may advantageously cause the audible pre-warn indicator 31' to also provide an audible confirmation indication responsive to the confirmation signal on the data communications bus 22'. It should be noted that the confirmation indication could be the same as the pre-warn indication, or it could be different, as desired.

In accordance with another advantageous aspect of the invention, the pre-warn emulator 27' may also switch between armed and disarmed operational modes responsive to the mode change signal, similar to the alarm controller 25'. Accordingly, the pre-warn emulator 27' may advantageously cause the pre-warn indicator 31' to provide a confirmation indication based upon switching between the armed and disarmed operational modes. Here again, this allows the pre-warn vehicle security device 20' to provide an audible confirmation indication in addition to the confirmation indication that would otherwise be provided by the alarm controller 25' (e.g., one or more flashes of the vehicle light 23').

Figure 7:
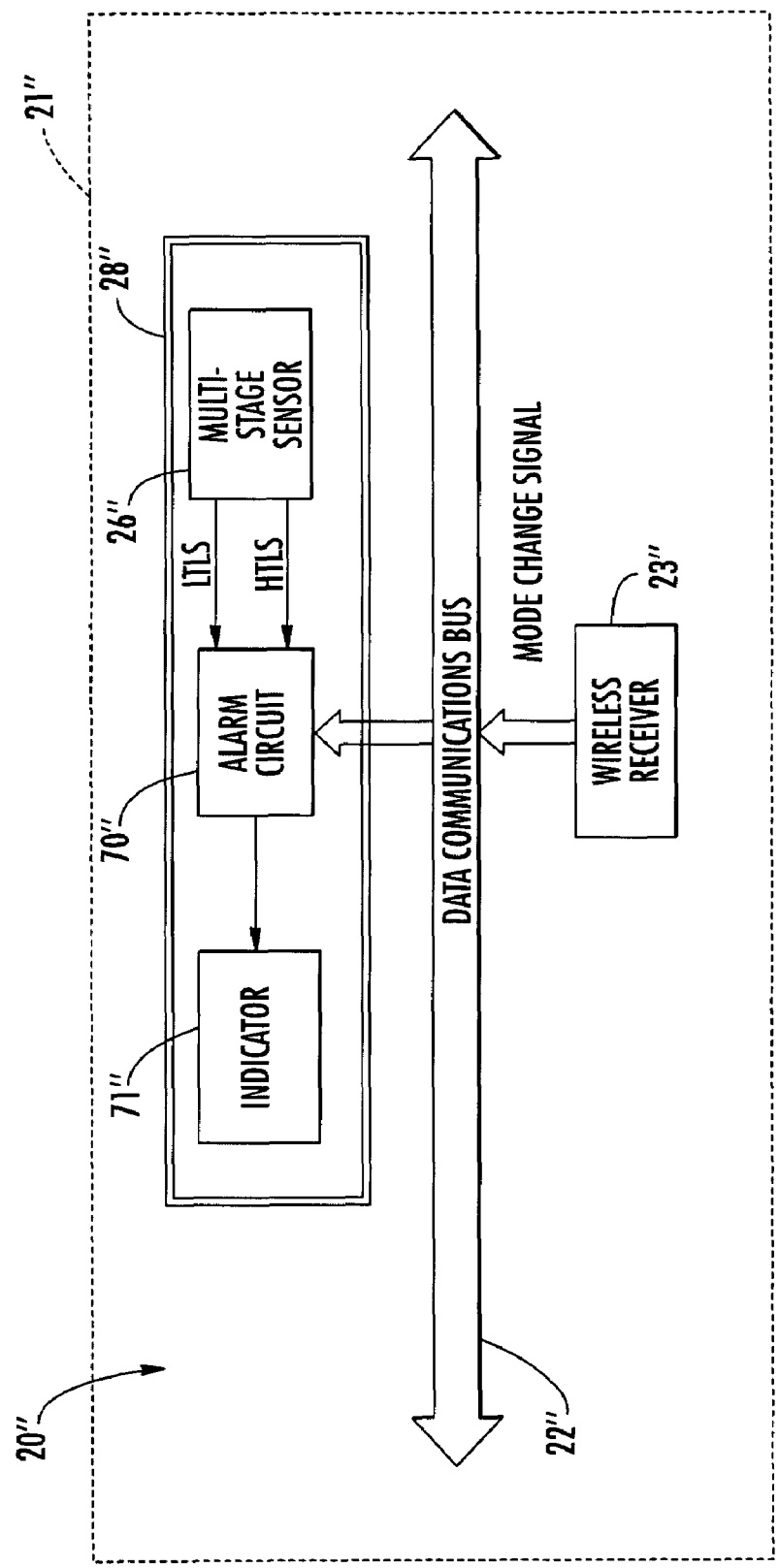
FIG. 7 is a schematic block diagram of a vehicle including yet another alternate embodiment of the pre-warn vehicle security device in accordance with the present invention.

Turning now additionally to FIG. 7, another advantageous aspect of the invention in which the vehicle 21" includes one or more vehicle devices, such as the wireless receiver 23", which interfaces with the data communications bus 22" and generates a mode change signal on the data communications bus. By way of example, the wireless receiver 23" may be for receiving lock/unlock signals from a user's key fob for activating a remote keyless entry (RKE) device (not shown). Thus, as discussed above, the lock signal would be an armed mode signal for the RKE device, while the unlock signal functions would be a disarmed mode signal for the RKE device.

The pre-warn vehicle security device 20" may include an alarm circuit 70", similar to the pre-warn emulator 27 discussed above, connected to the multi-stage sensor 26" and interfacing with the data communications bus 22". More particularly, the alarm circuit 70" may switch between armed and disarmed operational modes responsive to the mode change signal from the wireless receiver 23" (or other suitable vehicle devices, depending upon the given application). Moreover, the pre-warn vehicle security device also includes an indicator 71", similar to the pre-warn indicator 31 noted above, carried by the housing 28" and connected to the alarm circuit 70".

In accordance with the present aspect of the invention, when the alarm circuit 70" is in the armed operational mode, it causes the indicator 71" to generate a pre-warn indication responsive to the sensed low security threat level. Moreover, when in the armed mode, the alarm circuit 70" also causes the indicator 71" to generate an alarm indication responsive to the sensed high security threat level. The pre-warn and alarm indications may be similar to those described previously above. In addition, the alarm circuit 70" may further cause the indicator 71" to generate a confirmation indication upon switching between armed and disarmed operational modes, again similar to that described above.

Thus, it will be appreciated by those skilled in the art that the pre-warn vehicle security device 21" may advantageously be used to provide full alarm system capabilities (including sensing and indicating both pre-warn and alarm events) in a vehicle with no pre-existing alarm system. As in the illustrated example, the pre-warn security device 21" thus provides a convenient and economical compliment for providing pre-warn and alarm features in a vehicle which already has an RKE device but no alarm system.

Even so, it should be noted that the pre-warn security device 21" could also be used in vehicle with no RKE device whatsoever. For example, the mode change signal could be provided by an ignition switch connected to the data communications bus 22', which provides an armed mode signal for the alarm circuit 70" upon being switched to the off position, and providing a disarmed mode signal upon being switched to the on position. Thus, the alarm circuit 27" would switch to the armed mode when the vehicle is turned off (i.e., when the owner is away from the vehicle), and it would switch to the disarmed mode once the owner returns to the vehicle and turns the ignition switch on. Of course, various other configurations and applications are also possible in addition to the examples provided above, as will be readily appreciated by those skilled in the art.

A method aspect of the invention is for upgrading a vehicle security system in a vehicle 20 including a data communications bus 22. The method includes installing a pre-warn security device 20 in the vehicle and interfacing the pre-warn security device with the data communications bus 22, as will be appreciated by those of skill in the art. Further method aspects will be readily apparent based upon the foregoing discussion and will therefore not be discussed further herein.

It will therefore be appreciated that the pre-warn vehicle security device 20 of the present invention is advantageously well suited for upgrading vehicles with pre-installed vehicle security systems to provide such pre-warn functionality. Moreover, this may be done relatively conveniently and inexpensively without installing an entirely new security system in the vehicle.

Additional features of the invention may be found in the co-pending application entitled VEHICLE SECURITY DEVICE HAVING PRE-WARN FEATURES AND RELATED METHODS, the entire disclosure of which is hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A pre-warn vehicle security device for a vehicle comprising a data communications bus extending throughout the vehicle and carrying data and address information thereover, an audible alert indicator, and an alarm controller interfacing with the data communications bus extending throughout the vehicle and carrying data and address information thereover and causing the audible alert indicator to generate an audible alarm indication responsive to a sensed high security threat level condition, the pre-warn vehicle security device comprising:

a housing;

a multi-stage sensor carried by said housing for sensing the high security threat level condition and communicating the sensed high security threat level condition to the alarm controller via the data communications bus extending throughout the vehicle and carrying data and address information thereover, and for sensing a low security threat level condition lower than the sensed high security threat level condition; and an audible pre-warn indicator carried by said housing and connected independently of the data communications bus to said multi-stage sensor for generating an audible pre-warn indication responsive to the sensed low security threat level condition, the audible pre-warn indication having a lesser volume and a shorter duration than the audible alarm indication.

2. The pre-warn vehicle security device of claim 1 further comprising a pre-warn emulator for generating a high security threat level signal on the data communications bus extending throughout the vehicle and carrying data and address information thereover responsive to the sensed high security threat level.

3. The pre-warn vehicle security device of claim 2 wherein the alarm controller generates a confirmation signal on the data communications bus extending throughout the vehicle and carrying data and address information thereover upon switching between armed and disarmed operational modes, and wherein said pre-warn emulator causes said audible pre-warn indicator to provide an audible confirmation indication responsive to the confirmation signal.

4. The pre-warn vehicle security device of claim 2 wherein said pre-warn emulator switches between armed and disarmed operational modes based upon a mode change signal on the data communications bus extending throughout the vehicle and carrying data and address information thereover, and wherein said pre-warn emulator causes said audible pre-warn indicator to provide an audible confirmation indication upon switching between armed and disarmed operational modes.

5. The pre-warn vehicle security device of claim 2 further comprising a signal enabler for enabling said pre-warn emulator to operate using a desired set of signals for communicating with the alarm controller via the data communications bus extending throughout the vehicle and carrying data and address information thereover from a plurality of sets of signals for different alarm controllers.

6. The pre-warn vehicle security device of claim 1 wherein sail multistage sensor comprises a multi-stage shock sensor.

7. The pre-warn vehicle security device of claim 1 wherein said audible pre-warn indicator comprises a siren.

8. A pre-warn vehicle security device for a vehicle comprising a data communications bus extending throughout the vehicle and carrying data and address information thereover, an audible alert indicator, a vehicle light, and an alarm controller interfacing with the data communications bus extending throughout the vehicle and carrying data and address information thereover and causing the audible alert indicator to generate an audible alarm indication responsive to a sensed high security threat level condition, the alarm controller also for switching between armed and disarmed operational modes and causing the vehicle light to generate a confirmation indication based thereon, the pre-warn vehicle security device comprising:

a housing;

a multi-stage sensor carried by said housing for sensing the high security threat level condition and communicating the sensed high security threat level condition to the alarm controller via the data communications bus extending throughout the vehicle and carrying data and address information thereover, and for sensing a low security threat level condition lower than the sensed high security threat level condition; and an audible pre-warn indicator carried by said housing and connected independently of the data communications bus to said multistage sensor for generating an audible pre-warn indication responsive to the sensed low security threat level condition, and for generating an audible confirmation indication responsive to the alarm controller switching between armed and disarmed operational modes, the audible pre-warn indication having a shorter duration and a lesser volume than the audible alarm indication.

9. The pre-warn vehicle security device of claim 8 further comprising a pre-warn emulator for generating a high security threat level signal on the data communications bus extending throughout the vehicle and carrying data and address information thereover responsive to the sensed high security threat level.

10. The pre-warn vehicle security device of claim 9 wherein the alarm controller generates a confirmation signal on the data communications bus extending throughout the vehicle and carrying data and address information thereover upon switching between armed and disarmed operational modes, and wherein said pre-warn emulator causes said audible pre-warn indicator to provide the confirmation indication responsive to the confirmation signal.

11. The pre-warn vehicle security device of claim 9 wherein said pre-warn emulator switches between armed and disarmed operational modes based upon a mode change signal on the data communications bus extending throughout the vehicle and carrying data and address information thereover, and wherein said pre-warn emulator causes said audible pre-warn indicator to provide a confirmation upon switching between armed and disarmed operational modes.

12. The pre-warn vehicle security device of claim 9 further comprising a signal enabler for enabling said pre-warn emulator to operate using a desired set of signals for communicating with the alarm controller via the data communications bus extending throughout the vehicle and carrying data and address information thereover from a plurality of sets of signals for different alarm controllers.

13. The pre-warn vehicle security device of claim 8 wherein said multi-stage sensor comprises a multi-stage shock sensor.

14. The pre-warn vehicle security device of claim 8 wherein said audible pre-warn indicator comprises a siren.

15. A method for upgrading a vehicle security system in a vehicle comprising a data communications bus extending throughout the vehicle and carrying data and address information thereover, the vehicle security system comprising an audible alert indicator and an alarm controller for interfacing with the data communications bus extending throughout the vehicle and carrying data and address information thereover and causing the audible alert indicator to generate an audible alarm indication responsive to a sensed high security threat level condition, the method comprising:

installing a pre-warn vehicle security device in the vehicle comprising a housing, a multi-stage sensor carried by the housing for sensing the high security threat level condition and communicating the sensed high security threat level condition to the alarm controller via the data communications bus extending throughout the vehicle and carrying data and address information thereover, and for sensing a low security threat level condition lower than the sensed high security threat level condition, and an audible pre-warn indicator carried by the housing and connected independently of the data communications bus to the multi-stage sensor for generating an audible pre-warn indication responsive to the sensed low security threat level condition, the audible pre-warn indication having a shorter duration and a lesser volume than the audible alarm indication.

16. The method of claim 15 wherein the pre-warn vehicle security device further comprises a pre-warn emulator for generating a high security threat level signal on the data communications bus extending throughout the vehicle and carrying data and address information thereover responsive to the sensed high security threat level.

17. The method of claim 16 wherein the alarm controller generates a confirmation signal on the data communications bus extending throughout the vehicle and carrying data and address information thereover upon switching between armed and disarmed operational modes, and wherein the pre-warn emulator causes the audible pre-warn indicator to provide an audible confirmation indication responsive to the confirmation signal.

18. The method of claim 16 wherein the pre-warn emulator switches between armed and disarmed operational modes based upon a mode change signal on the data communications bus extending throughout the vehicle and carrying data and address information thereover, and wherein the pre-warn emulator causes the audible pre-warn indicator to provide an audible confirmation indication upon switching between armed and disarmed operational modes.

19. The method of claim 16 wherein the pre-warn vehicle security device further comprises a signal enabler for enabling the pre-warn emulator to operate using a desired set of signals for communicating with the alarm controller via the data communications bus extending throughout the vehicle and carrying data and address information thereover from a plurality of sets of signals for different alarm controllers.

20. The method of claim 15 wherein the pre-warn vehicle security sensor comprises at least one of a motion sensor and a shock sensor.

21. The method of claim 15 wherein the audible pre-warn indicator comprises a siren.

* * * * *